(12) United States Patent
Wang

(10) Patent No.: US 6,606,096 B2
(45) Date of Patent: Aug. 12, 2003

(54) METHOD OF USING A 3D POLYGONIZATION OPERATION TO MAKE A 2D PICTURE SHOW FACIAL EXPRESSION

(75) Inventor: Hong-Yang Wang, Hsintien (TW)

(73) Assignee: Bextech Inc., Hsintien Taipei (TW)

( * ) Notice: Subject to any disclaimer, the term of this patent is extended or adjusted under 35 U.S.C. 154(b) by 219 days.

(21) Appl. No.: 09/822,241

(22) Filed: Apr. 2, 2001

(65) Prior Publication Data

US 2002/0024520 A1 Feb. 28, 2002

(30) Foreign Application Priority Data

Aug. 31, 2000 (TW) ...................................... 89117831 A

(51) Int. Cl.$^7$ ............................................. G06T 15/70
(52) U.S. Cl. ....................................................... 345/473
(58) Field of Search ................................ 345/473, 419, 345/420, 423, 427, 428

(56) References Cited

U.S. PATENT DOCUMENTS

| | | | | |
|---|---|---|---|---|
| 5,107,444 A | * | 4/1992 | Wu | 345/419 |
| 5,255,352 A | * | 10/1993 | Falk | 345/582 |
| 5,995,119 A | * | 11/1999 | Cosatto et al. | 345/473 |
| 5,995,639 A | * | 11/1999 | Kado et al. | 382/118 |
| 6,016,148 A | * | 1/2000 | Kang et al. | 345/622 |
| 6,147,692 A | * | 11/2000 | Shaw et al. | 345/643 |
| 6,208,356 B1 | * | 3/2001 | Breen et al. | 345/473 |
| 6,249,292 B1 | * | 6/2001 | Christian et al. | 345/473 |
| 6,250,928 B1 | * | 6/2001 | Poggio et al. | 434/185 |
| 6,304,264 B1 | * | 10/2001 | Chen et al. | 345/419 |
| 6,381,346 B1 | * | 4/2002 | Eraslan | 382/118 |
| 6,532,011 B1 | * | 3/2003 | Francini et al. | 345/420 |

OTHER PUBLICATIONS

Article "Video Rewrite; Driving Visual Speech with Audio" by Christoph Bregler, Michele Covell, Malcolm Staney, Interval Research Corporation, Published 1997, 1801 Page Mill Road, Building C, Palo Alto, CA, 94304.See the SIGGRAPH Video Proceedings.*
Article "Synthesizing Realistic Facial Expressions from Photographs" by Frédéric Pighin, Jamie Hecker, Dani Lischinski, Richard Szeliski, David H. Salesin. Proceedings of the 25th annual conference on Computer graphics and interactive techniques Jul. 1998.*
Article "Making Faces" by Brian Guenter, Cindy Grimm, Daniel Wood, Henrique Malvar, Fredric Pighin. Proceedings of the 25th annual conference on Computer graphics and interactive techniques Jul. 1998.*
Article "Facial Animation: Past Present and Future" by Demetri Terzopoulos, B. Mones–Hattal, Beth Hofer, Frederic Parke, Doug Sweetland, Keith Waters. Proceedings of the 24th annual conference on Computer graphics and interactive techniques Aug. 1997.*
Article "What perceptible information can be implemented in talking head animations" Kuratate, T.; Masuda, S.; Vatikiotis–Bateson, E. Robot and Human Interactive Communication, 10th IEEE International Workshop on, 2001 pp. 430–435.*

* cited by examiner

*Primary Examiner*—Mark Zimmerman
*Assistant Examiner*—Euvique L Santiago
(74) *Attorney, Agent, or Firm*—Rosenberg, Klein & Lee

(57) ABSTRACT

A method of using a 3D polygonization operation to make a 2D picture show facial expression including the step of setting control points of a 2D picture as Z=0 or Z≡0 to form a meshed plain model, and the step of attaching the plain model thus obtained to the 2D picture.

4 Claims, 7 Drawing Sheets

METHOD OF USING A 3D POLYGONIZATION OPERATION TO MAKE A 2D PICTURE SHOW FACIAL EXPRESSION

BACKGROUND OF THE INVENTION

The present invention relates to a method of using a 3D polygonization operation to make a 2D picture show facial expression. When added with dialog, it looks as if alive. This method occupies less computer memory space, and is suitable for use in different web sites, education, E-Mail, advertising, conference, and etc.

There are known two methods of using a 2D picture to show a facial expression. The first method uses an image processing technique to process the image of the 2D picture. This method is complicated, occupies much computer memory space, and cannot eliminate distortion of facial expression. Because of low drawing speed, it cannot achieve the operation and provides the output on time. The second method is a 3D method. This method includes the step of preparing a 3D meshed model 1000 (see FIGS. 1 and 8, which were obtained from Redted), the step of cutting the object from the selected picture and then attaching the object to the 3D model 1000 to set the facial expression. When attaching the object to the 3D model, a distortion of facial expression may occur, and special technique is required to remove background from the picture. If it is required to add the background to the picture, the procedure is complicated and time-consuming, and only specially trained technician can do the job.

SUMMARY OF THE INVENTION

The invention has been accomplished under the circumstances in view. It is one object of the present invention to provide a method of making a 2D picture show a facial expression, which is easy to operate. It is another object of the present invention to provide a method of making a 2D picture show a facial expression, which occupies less computer memory space. It is still another object of the present invention to provide a method of making a 2D picture show a facial expression, which is suitable for use in different web sites, education, E-Mail, advertising, conference, and etc. The method of the present invention comprises the step of setting control points of a 2D picture as Z=0 or Z≡0 to form a meshed plain model, and the step of attaching the plain model thus obtained to the 2D picture.

DETAILED DESCRIPTION OF THE PREFERRED EMBODIMENT

The method of using a 3D polygonization operation to make a 2D picture show facial expression comprises the step of preparing a meshed model (see FIG. 3), the step of setting control points Z=0 or Z≡0 to form a plain model 300, and the step of attaching the plain model 300 to the 2D picture 200.

Figure 3:
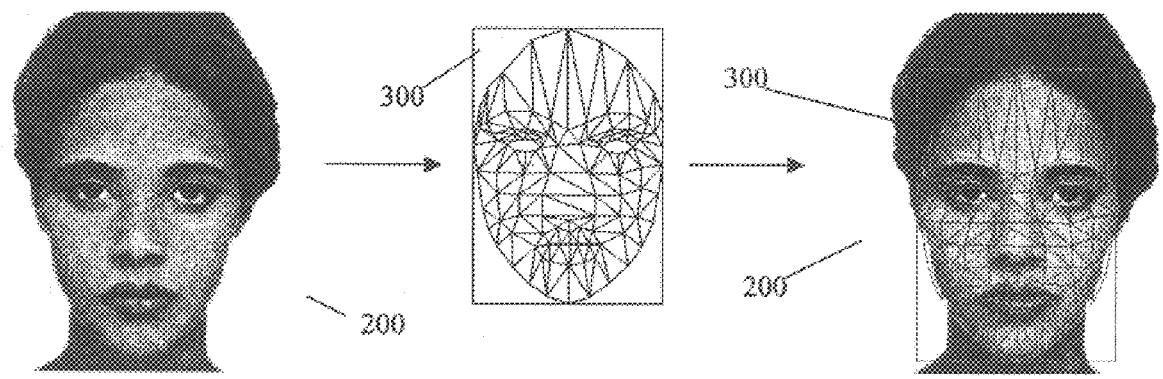
FIG. 3 illustrates the procedure of the attachment of the model to the picture according to the present invention.
Figure 5:
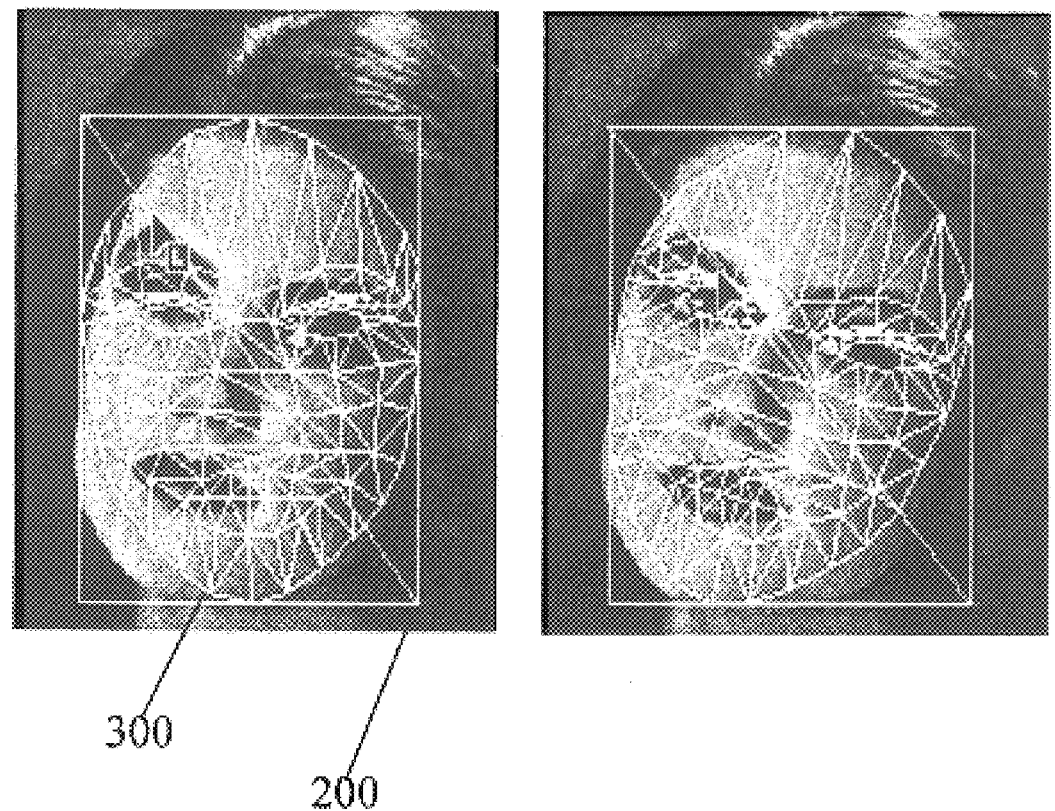
FIG. 5 illustrates the model attached to the picture, the positions of the meshed points adjusted.
Figure 5:
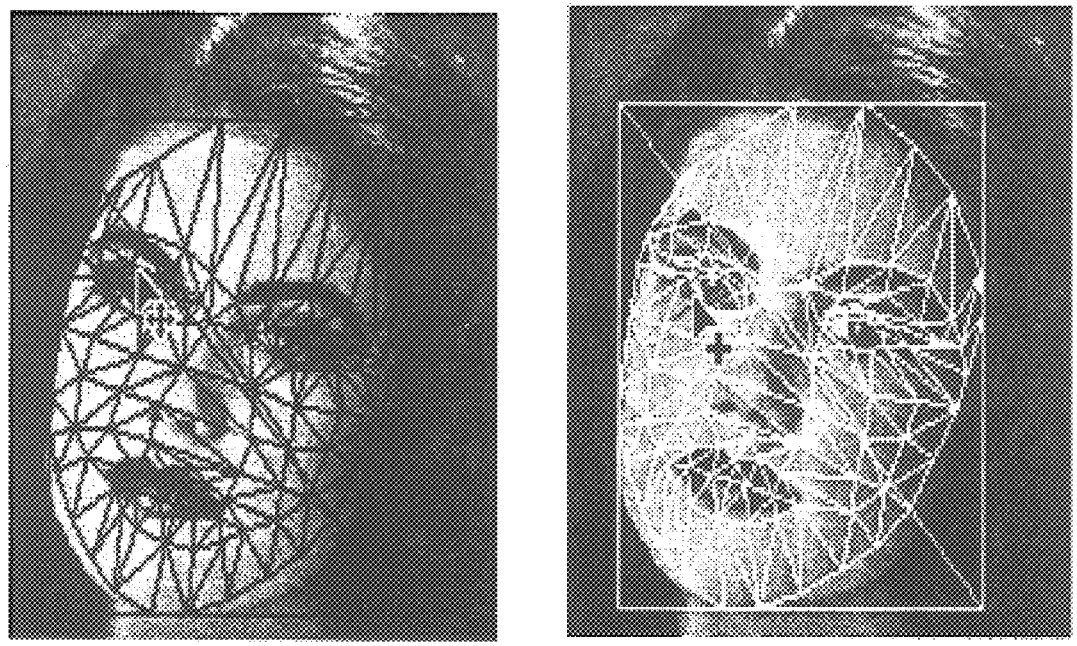
Figure 6:
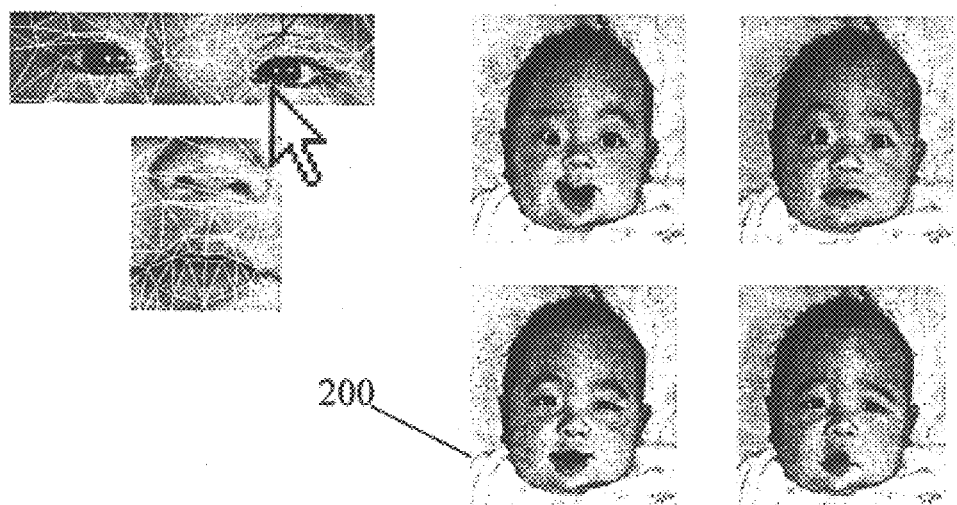
FIG. 6 illustrates the positions of the meshed points adjusted, the facial expression of the picture changed according to the present invention.
Figure 7:
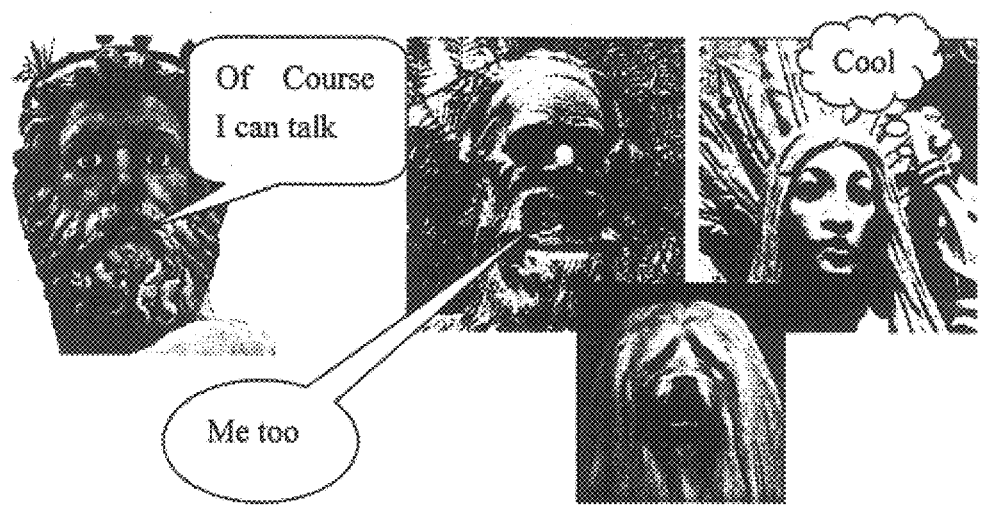
FIG. 7 shows the facial expression of the picture changed subject to the attached dialog according to the present invention.
Figure 8:
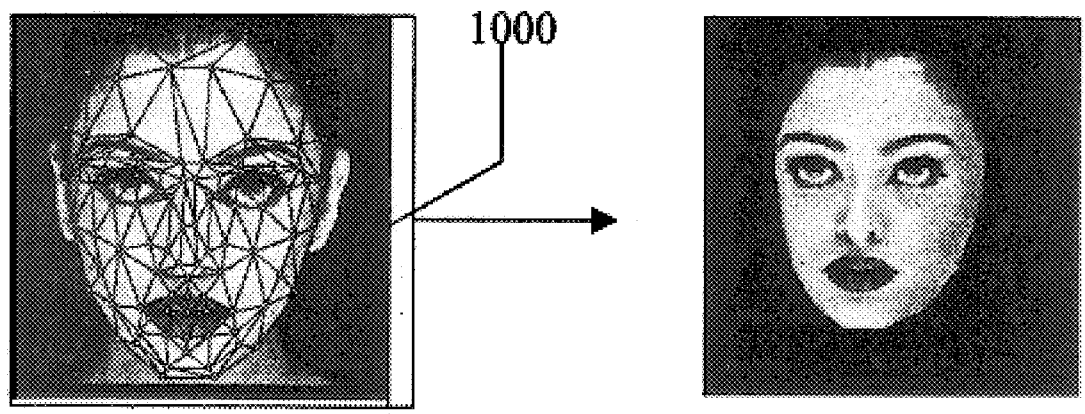

As illustrates in FIG. 3, take a picture 200 and its plain model 300, and then attach the plain model 300 to the picture 200 without removing the background (see FIGS. 6, 7 and 9), and then directly use the mouse to click the meshed points of the model 300, so as to modify the proportion of the five organs relative to the picture 200 (see FIGS. 5 and 6).

Figure 1:
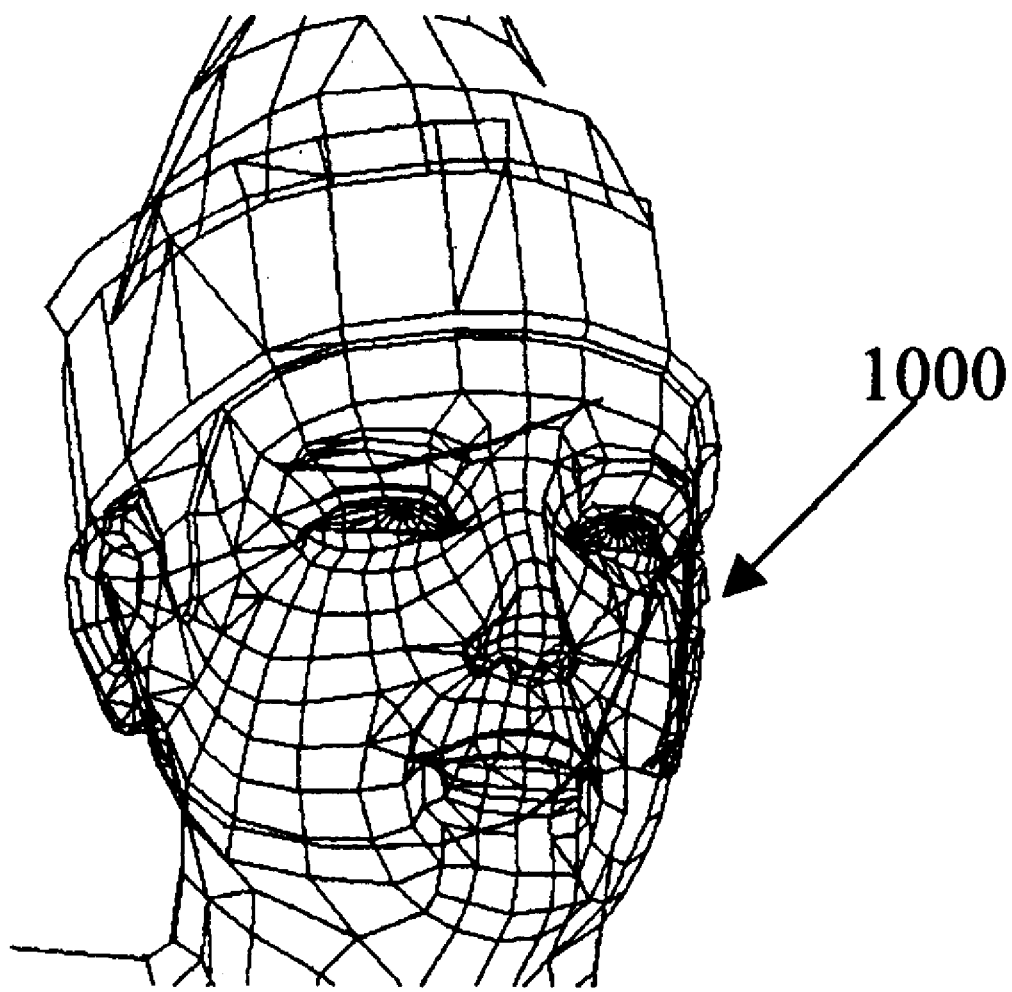
FIGS. 1 and 8 illustrate a 3D model attached to a 2D picture according to the prior art.
Figure 2:
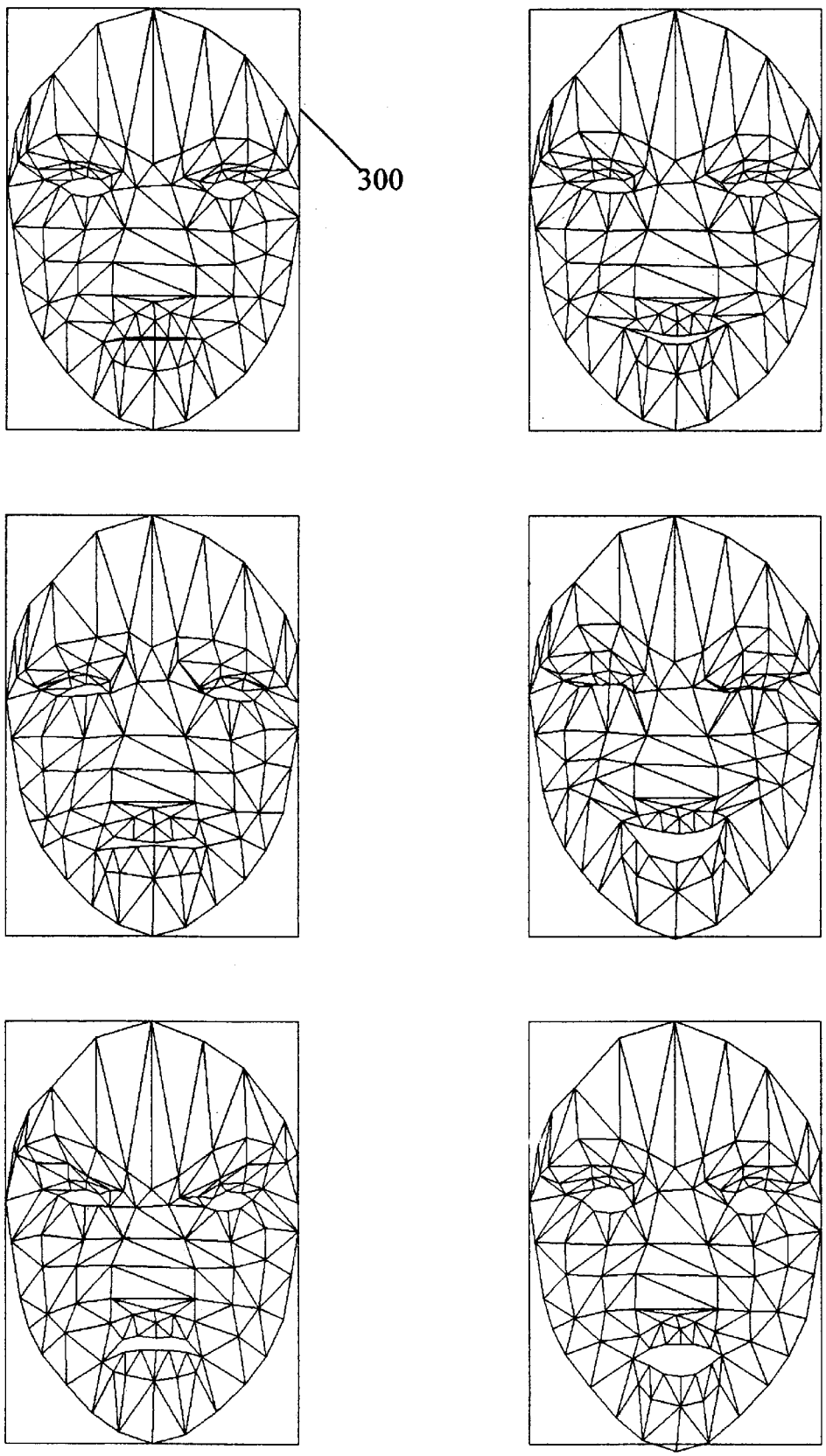
FIGS. 2 and 4 illustrate changes of facial expression of the model and the 3D picture.
Figure 4:

As shown in FIGS. 2, 4 and 6, the model 300 can be used to change the positions of meshed points so as to vary the facial expression with the dialog. By means of the application of TTS (TEST TO SPEECH) or MOSCAP software techniques, a continuous facial expression is achieved.

Figure 9:
FIG. 9 illustrates multiple objects in the picture with multiple model settings according to the present invention.

Referring to FIG. 9, the model 300 can be edited subject to different objects (animal, car, etc.) in the picture.

As indicated above, the present invention provides a method of using a 3D polygonization operation to make a 2D picture show facial expression by attaching, which occupies less computer memory capacity and, is suitable for use in different web sites, education, E-Mail, Advertising, conference, and etc.

It is to be understood that the drawings are designed for purposes of illustration only, and are not intended for use as a definition of the limits and scope of the invention disclosed.

What the invention claimed is:

1. A method of using a predefined planar mesh operation to make a two-dimensional picture animated with facial expressions, comprising the steps of:

setting control points of a two-dimensional picture on a Z=0 plane to form a meshed plane model;

attaching the plane to the two-dimensional picture; and, using text-to-speech and motion capture techniques to change the positions of meshed points of said meshed plane models so as to achieve a continuous facial expression.

2. The method of using a predefined planar mesh operation to make a two-dimensional picture animated with facial expression as recited in claim 1 further comprising the step of using a pointing device to control the meshed points of said meshed plane model, and to modify the proportion of the facial expression relative to said two-dimensional picture.

3. The method of using a predefined planar mesh operation to make a two-dimensional picture animated with facial expressions as recited in claim 1 wherein said meshed plane model is edited subject to different objects in said two-dimensional picture so as to match with a dialogue in showing a speaking facial expression.

4. The method of using a predefined planar mesh operation to make a two-dimensional picture animated with facial expressions as recited in claim 1 wherein the shape of said meshed plane model is adjusted subject to different objects in said two-dimensional picture.

* * * * *